United States Patent
Endo et al.

(10) Patent No.: US 9,422,643 B2
(45) Date of Patent: Aug. 23, 2016

(54) METHOD FOR PRODUCING ARTICLE

(71) Applicant: KURARAY CO., LTD., Kurashiki-shi (JP)

(72) Inventors: Ryokei Endo, Chiyoda-ku (JP); Yosuke Washitake, Kurashiki (JP); Jun Aramaki, Osaka (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/634,125

(22) Filed: Feb. 27, 2015

(65) Prior Publication Data

US 2015/0167199 A1 Jun. 18, 2015

Related U.S. Application Data

(63) Continuation of application No. 13/812,697, filed as application No. PCT/JP2011/066335 on Jul. 19, 2011, now abandoned.

(30) Foreign Application Priority Data

Jul. 29, 2010 (JP) .................. 2010-170350

(51) Int. Cl.
*D01F 6/92* (2006.01)
*D01F 6/74* (2006.01)
*D01F 6/84* (2006.01)
*D04H 1/54* (2012.01)
*D01F 6/94* (2006.01)
*C08L 67/02* (2006.01)
*C08L 79/08* (2006.01)
*D04H 1/55* (2012.01)
*B29C 43/00* (2006.01)

(52) U.S. Cl.
CPC ............... *D01F 6/84* (2013.01); *C08L 67/02* (2013.01); *C08L 79/08* (2013.01); *D01F 6/74* (2013.01); *D01F 6/92* (2013.01); *D01F 6/94* (2013.01); *D04H 1/55* (2013.01); *B29C 43/003* (2013.01); *D10B 2331/04* (2013.01); *D10B 2331/14* (2013.01); *D10B 2401/04* (2013.01)

(58) Field of Classification Search
None
See application file for complete search history.

(56) References Cited

U.S. PATENT DOCUMENTS

| 4,141,927 | A | * | 2/1979 | White | C08L 67/02 525/420 |
|---|---|---|---|---|---|
| 5,431,782 | A | | 7/1995 | Cassat | |
| 5,439,987 | A | | 8/1995 | Scott et al. | |
| 5,869,183 | A | | 2/1999 | Oka et al. | |
| 6,114,472 | A | * | 9/2000 | Matsuki | C08L 67/02 525/425 |
| 6,245,268 | B1 | | 6/2001 | Oka et al. | |
| 6,677,039 | B2 | | 1/2004 | Branchesi et al. | |
| 2003/0104201 | A1 | | 6/2003 | Branchesi et al. | |
| 2004/0115452 | A1 | | 6/2004 | Flexman et al. | |
| 2007/0142569 | A1 | | 6/2007 | Donovan et al. | |
| 2012/0015184 | A1 | | 1/2012 | Endo et al. | |
| 2014/0342293 | A1 | | 11/2014 | O'Neil et al. | |

FOREIGN PATENT DOCUMENTS

| CN | 1046916 A | 11/1990 |
|---|---|---|
| EP | 0 699 784 A2 | 3/1996 |
| JP | 790724 | 4/1995 |
| JP | 2000-303264 | 10/2000 |
| JP | 2001-271227 | 10/2001 |
| JP | 2001-323146 | 11/2001 |
| JP | 2005-263957 | 9/2005 |
| JP | 2005-314601 A | 11/2005 |
| JP | 2006-118066 | 5/2006 |
| JP | 2007-177347 | 7/2007 |
| JP | 2008-274042 A | 11/2008 |
| JP | 2009-132896 | 6/2009 |
| JP | 2011-127252 | 6/2011 |

OTHER PUBLICATIONS

Notification of Reason(s) for Rejection issued Oct. 21, 2014 in Japanese Patent Application No. 2012-526430 (with English Summary).

Martinez, J. M. et al., "Miscibility of Poly(ether imide) and Poly(ethylene terephthalate)," Journal of Applied Polymer Science, vol. 48, No. 5, pp. 935 to 937, (1993).

Chen, H., "Miscibility and Crystallization Behavior of Poly(ethylene terephthalate)/Poly(ether imide) Blends," Macromolecules, vol. 28, pp. 2845 to 2851, (1995).

(Continued)

*Primary Examiner* — Ana Woodward

(74) *Attorney, Agent, or Firm* — Oblon, McClelland, Maier & Neustadt, L.L.P.

(57) ABSTRACT

Provided are a heat-fusible fiber having excellent heat resistance, flame retardancy and dimensional stability; a fiber structure comprising the heat-fusible fiber; and a molded article produced by applying a heat fusion treatment to the fiber structure and having excellent heat resistance. The heat-fusible fiber comprises an amorphous PES type polymer (A) not substantially having a melting point and an amorphous PEI type polymer (B) in the mixture ratio (weight) of (A)/(B)=5/95 to 95/5, the fiber having a single glass transition temperature in the range between 80° C. and 200° C., and being amorphous. The fiber structure comprises 10% by weight or higher of the amorphous heat-fusible fiber. The molded article comprises at least a fiber structure comprising 10% by weight or higher of the amorphous heat-fusible fiber, to be fusion-bonded at a temperature higher than the glass transition temperature of the amorphous heat-fusible fiber.

18 Claims, No Drawings

(56) References Cited

OTHER PUBLICATIONS

Jang, J. et al., "Spectroscopic studies of the crystallization behaviour in poly(ether imide)/poly(ethylene terephthalate) blends," Polymer, vol. 38, No. 16, pp. 4043 to 4048, (1997).
International Search Report Issued Oct. 11, 2011 in PCT/JP11/66335 Filed Jul. 19, 2011.
Combined Chinese Office Action and Search Report issued Dec. 10, 2013 in Patent Application No. 201180035836.X (with English summary of the Office Action).
Extended European Search Report issued Jan. 28, 2014 in Patent Application No. 11812305.8.
Nathalie Gonzalez-Vidal, et al., "Poly(ethylene-co-1,4-cyclohexylenedimethylene terephthalate) Copolyesters Obtained by Ring Opening Polymerization" Journal of Polymer Science Part A: Polymer Chemistry, vol. 47, No. 2, XP055097289, Oct. 6, 2009, pp. 5954-5966.
Won Ho Jo, et al., "Miscibility of poly(ether imide)/poly(ethylene terephthalate) blends" Polymer Bulletin, vol. 33, No. 1, XP000459066, Jun. 1, 1994, pp. 113-118.
Machine translation of 2001-271227.
Machine translation of 2011-127252.
U.S. Appl. No. 14/539,657, filed Nov. 12, 2014, Endo, et al.
Combined Taiwanese Office Action and Search Report issued Feb. 1, 2016 in Patent Application No. 100126705 (with English translation of Search Report and English translation of categories of cited documents).
Taiwanese Decision of Rejection issued Jun. 15, 2016, in Taiwanese Patent Application No. 100126705 (with English Summary of Decision of Rejection), 5 pages.

* cited by examiner

METHOD FOR PRODUCING ARTICLE

CROSS REFERENCE TO THE RELATED APPLICATIONS

This application is a continuation application of U.S. patent application Ser. No. 13/812,697, which is a national stage of International Patent Application No. PCT/JP11/066335, filed Jul. 19, 2011, which is based on and claims Convention priority to Japanese application No. 2010-170350, filed Jul. 29, 2010. The contents of these applications are incorporated herein by reference in their entirety.

FIELD OF THE INVENTION

The present invention relates to an amorphous heat-fusible fiber having an outstanding heat resistance, fire retardancy, and dimensional stability; a fiber structure containing the fiber; and a heat-resistant molded article formed by fusion-bonding the fiber structure. In particular, the present invention relates to an amorphous heat-fusible fiber being extremely effective to a use frequently exposed to high temperature environment in general industrial material fields, electric and electronic fields, agricultural material fields, optical material fields, aircraft, automobile, and vessel material fields, apparel fields, etc; a fiber structure containing the fiber; and a heat-resistant molded article formed by fusion-bonding the fiber structure.

In the present invention the term "fiber" means a fiber having various kinds of forms, such as single fiber, staple fiber, shortcut fiber, filament yarn, spun yarn, and the like. In the present invention the term "amorphous" means not having a crystal melting point but having a character in which softening or fusion starts above the glass transition temperature which is lower than the melting point of a crystalline polymer. In the present invention the term "heat-fusibility" means that when a heat-fusible fiber is heated at a temperature higher than a certain temperature to be soften, the fiber can fusion-bond to another fiber which is closely touched to the heat-fusible fiber and comprises the same material with or different material from the heat-fusible fiber. In the present invention the term "fiber structure" means the fiber structure including various kinds of forms, such as nonwoven fabrics (paper is also included), textiles, knittings, and the like. Moreover, in the present invention the term "molded article" means a various form of molded articles which at least includes a fiber structure containing an amorphous heat-fusible fiber. The molded article may include other fiber structure(s), a polymer usable as matrix, and others. In the present invention the term "heat-resistant molded article with heat resistance" means that the molded article is excellent in tolerance under high temperature and can be represented by using a index such as a dry heat shrinkage percentage.

BACKGROUND ART

In recent years, fiber structures, such as nonwoven fabric and paper, are increasingly used in which the constituent fibers are adhered using heat-fusible fibers. Such fiber structures include interior material for cars, base fabric for carpets, highly efficient filters, supports for water processing membranes, hook-and-loop fasteners, and others. Furthermore, the demand of the thermoplastic composite is also greatly extended in some fields, such as a structure component for an aircraft, and a housing of home electronics. The thermoplastic composite is produced by preparing a paper or nonwoven fabric comprising inorganic fibers, such as carbon fibers and glass fibers, as a reinforcement fiber and heat-fusible fibers; and processing them at a temperature high enough to fuse the heat-fusible fibers so as to make both fibers unified like a matrix.

The heat-fusible fibers include various types of fibers, such as a polyethylene-polypropylene composite fiber which comprises polyethylene as an adhesive component; a nylon-polypropylene composite fiber in which a copolymerized nylon is used as an adhesive component; a composite fiber of polyethylene terephthalate and ethylene vinyl alcohol copolymer in which the ethylene vinyl alcohol copolymer is used as an adhesive component; a composite fiber of amorphous polyester and polyethylene terephthalate; and others. In particular, polyester type heat-fusible composite fibers are widely used in various fields because of their outstanding light resistance, mechanical property, durability, and further recyclability.

Major polyester (hereinafter sometimes abbreviated as PES) type heat-fusible composite fibers widely proposed are so-called sheath core composite fibers arranging as a core part a crystalline PES type polymer represented by polyethylene terephthalate and as a sheath part an amorphous PES type polymer comprising a component disturbing crystallinity of the polymer as a copolymerizable component, such as isophthalic acid (for example, see Patent Document 1). Since these heat-fusible fibers consist of a crystalline core part having a high melting point, and an amorphous sheath part being softened at a lower temperature than the melting point, they can be used as an adhesive component by heat-treating them at a temperature higher than the glass transition temperature of the sheath part so as to allow only the sheath part to be fused. These heat-fusible fibers can keep their fiber form without fusing the core part. In order to meet the demand for adhesion temperature to be applied or the heat-resistant demand for the real use, many trials have been widely proposed in which the copolymerization ratio, etc. are designed in amorphous PES type polymers.

On the other hand, a sheath core composite fiber has been also widely proposed which arranges in the sheath part an amorphous PES type polymer comprising a special monomer as a copolymerizable component in order to improve heat resistance (for example, see Patent Document 2).

There also has been widely proposed a resin composition or a fiber which has a glass transition temperature higher than the glass transition temperature of a PES fiber and comprises cellulose, polycarbonate, polysulfone, polyarylate, polyether sulfone, etc as a blendable component (for example, Patent Document 3).

For the purpose of enhancing the glass transition temperature of polyethylene terephthalate fiber consisting of polyethylene terephthalate, the fiber or film which includes polyetherimide (hereinafter sometimes abbreviated as PEI) type polymer as a blendable component which shows good compatibility with polyethylene terephthalate (for example, see Patent Documents 4 and 5).

CONVENTIONAL ART DOCUMENT

Patent Document

[Patent Document 1] JP Patent No. 4049940
[Patent Document 2] JP Laid-open Patent Publication No. 2006-118066
[Patent Document 3] JP Laid-open Patent Publication No. 2007-177347

[Patent Document 4] JP Laid-open Patent Publication No. 2001-271227

[Patent Document 5] JP Laid-open Patent Publication No. 2001-323146

DISCLOSURE OF THE INVENTION

Problems to be Resolved by the Invention

In general the PES type sheath core composite fiber described in the Patent Document 1 and others are drawn at a determined draw ratio and heat-treated at the purpose of raising the crystallinity of the crystalline PES type polymer arranged in the core part so as to give dimensional stability. However, when the drawing temperature is set above the glass transition temperature of the amorphous PES type polymer in a sheath part, agglutination will arise between fibers resulting in extreme deterioration of processability in the post processes such as card process. In order to prevent such agglutination, the drawing temperature must be lower than the glass transition temperature of the amorphous PES type polymer arranged in the sheath part. Therefore, the crystalline PES type polymer in a core part cannot be sufficiently oriented and crystallized at the drawing process and/or heat treatment process. Such a fiber inherently has strain caused by drawing, resulting in larger dry heat shrinkage percentage. As a result, such fiber products have troubles such as poor thermal dimensional stability. Moreover, since the sheath core composite fiber described in Patent Document 2 comprises the special component as a copolymerizable component, such a fiber has problems of increased manufacture cost etc. Furthermore, such a fiber having a form of sheath core composite type can increase neither drawing temperature nor heat treatment temperature, resulting in failing to solve the problem of thermal dimensional stability.

In the application of thermoplastic composite described above, it is necessary to fuse whole fiber. When such a sheath core composite fiber is used, the fiber may be heat-treated above the melting point of the core part having a higher melting point. Thus obtained molded article, however, has a matrix in which crystalline PES type polymer as the core part is randomly intermingled with amorphous PES type polymer as the sheath part without compatibilizing with each other. In such a case, considering that the obtained article cannot have the stabilized quality and has seriously declined mechanical properties such as elasticity around the glass transition temperature of polymer, the sheath core composite type heat-fusible fiber cannot be substantially used in these applications because the heat resistance of the molded article is consequently governed by the nature of the amorphous PES type polymer.

Further, since the fiber described in Patent Document 3 is basically a non-compatible blend type fiber, the fiber has a plurality of glass transition temperatures or melting points resulting from two types of polymers. Such a fiber is unsuitable for use to a thermoplastic composite as described above, and is not used in the practical application. In addition, non-compatible two polymer species existing at random in the fiber render the fiber having trouble for securing the quality.

In the types described in Patent Documents 4 and 5, since each of the polymers can compatibilize with each other on the molecular level in the amorphous portion, these types have the single glass transition temperature so as to be effective for the polyethylene terephthalate fibers to enhance their heat resistance. Furthermore, these fibers does not need the form of a sheath core composite fiber and can be used as a fiber consisting of only polyethylene terephthalate. However, such fibers have higher glass transition temperature while they may have the melting point of the original polyethylene terephthalate depending on the mixture ratio of the amorphous PEI type polymer. Accordingly, it is difficult to use these fibers as a thermoplastic composite or the like. It is also well-known that a higher mixture ratio of the amorphous PEI type polymer contributes to obtain an amorphous resin composition or an amorphous fiber. However, since polyethylene terephthalate is originally a crystalline polymer, long time exposition of the polymer under a high temperature makes the polymer to have advanced crystallization and phase-separation. Such fibers have problems to become fragile.

Therefore, the conventional technology could not attain the amorphous heat-fusible fiber which is applicable to thermoplastic composites, does not have the substantial melting point but has the single glass transition temperature, and is not a sheath core type. The inventors of the present invention have noted that a heat-fusible fiber having heat resistance, fire retardancy, dimensional stability etc. has been required because of wider applications of the heat-fusible fiber. Moreover, the inventors have also noted that in the application of thermoplastic composites which require not only high basic physical properties but also lightweight and recycling properties as well as simplicity of manufacture, it is desirable to obtain a heat-fusible fiber which is neither a conventional sheath core composite type fiber having two polymer species randomly existed in the non-compatibilized state in the matrix, nor a fiber having non-compatible two or more polymers mixed. Further, the inventors have noted that in view of durability there is a need to use a heat-fusible fiber being amorphous not crystalline and a molded article comprising the same for the applications under high temperature. Therefore the present inventors have decided to solve the problems by providing an amorphous heat-fusible fiber excellent in heat resistance, fire retardancy, and dimensional stability.

As a result of intensive studies conducted by the inventors of the present invention to obtain the above-mentioned amorphous heat-fusible fiber, it has been finally found that by mixing an amorphous PES type polymer and an amorphous PEI-type polymer at a specific ratio, an amorphous heat-fusible fiber can be produced which comprises uniformly compatibilized polymers, has a single glass transition temperature, and is excellent in heat resistance, fire retardancy, and dimensional stability.

That is, a first aspect of the present invention provides an amorphous heat-fusible fiber comprising an amorphous PES type polymer (A) not substantially having a melting point and an amorphous PEI type polymer (B) in the mixture ratio (weight) of (A)/(B)=5/95 to 95/5, the fiber having a single glass transition temperature in the range between 80° C. and 200° C.

In the above-mentioned aspect of the present invention, the amorphous PES type polymer may be preferably an amorphous PES type polymer consisting of terephthalic acid component (D) and isophthalic-acid component (E) as the dicarboxylic acid component in the copolymerization ratio (mole % ratio) of (D)/(E)=70/30 to 40/60. Moreover, the amorphous PEI type polymer preferably has a main repeating structure unit represented by the following formula [Formula 1], and a glass transition temperature of 210° C. or higher.

[Formula 1]

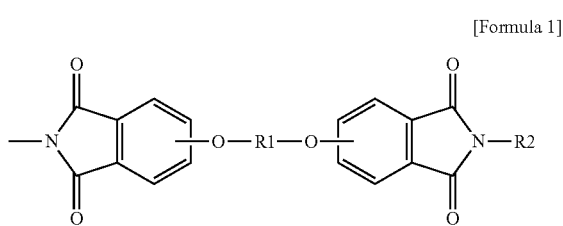

In the formula, R1 represents a divalent aromatic residue having 6 to 30 carbon atoms, and R2 represents a divalent organic group selected from the group consisting of a divalent aromatic residue having 6 to 30 carbon atoms, an alkylene group having 2 to 20 carbon atoms, a cycloalkylene group having 2 to 20 carbon atoms, and a polydiorganosiloxane group in which the chain is terminated by an alkylene group having 2 to 8 carbon atoms.

Furthermore, the above-mentioned amorphous heat-fusible fiber preferably has a dry heat shrinkage percentage at a temperature of (glass transition temperature −10)° C. of 3% or less. The fiber is preferably a melt-spun and un-drawn fiber comprising a blend of the amorphous polyester type polymer and the amorphous polyether type polymer.

A second aspect of the present invention is a fiber structure including 10% by weight or higher of an amorphous heat-fusible fiber of the first aspect of the present invention.

A third aspect of the present invention is a heat-resistant molded article comprising at least a fiber structure of the second aspect of the present invention to be fusion-bonded at a temperature higher than the glass transition temperature of the amorphous heat-fusible fiber.

Effect of the Invention

According to the first aspect of the present invention, it is possible to provide an amorphous heat-fusible fiber having a single glass transition temperature and excellent in heat-resisting property, fire retardancy, and dimensional stability because in the fiber obtained by mixing an amorphous PES type polymer and an amorphous PEI-type polymer at a specific ratio both polymers are in the uniformly compatibilized state. Therefore, such an amorphous heat-fusible fiber is especially applicable to use frequently exposed under high temperature. Furthermore, the amorphous heat-fusible fiber of the present invention can be manufactured with an ordinary fiber manufacturing process without special process.

According to the second aspect of the present invention, it is possible to provide a fiber structure, such as paper, nonwoven fabric, textile, and knitting, including the above-mentioned amorphous heat-fusible fiber singly or in combination with various constituent fibers at a mixing ratio for the amorphous heat-fusible fiber of 10% by weight or greater, to provide a fiber structure having heat-fusible property originated from the amorphous heat-fusible fiber as well as realizing heat-resisting property, fire retardancy, and dimensional stability.

The third aspect of the present invention provides a heat-resistant molded article comprising at least the above-mentioned amorphous heat-fusible fiber, and can be obtained by fusion-bonding the above-mentioned fiber structure. Since the obtained molded article comprising the above amorphous heat-fusible fiber also has enhanced heat-resisting property, fire retardancy, and dimensional stability, the molded article can be very effectively used in various applications in general industrial material fields, electric and electronic fields, agricultural material fields, optical material fields, aircraft, automobile, and vessel material fields, apparel fields, etc.

DESCRIPTION OF THE EMBODIMENTS

Mixture Ratio of Amorphous PES Type Polymer and Amorphous PEI Type Polymer

In the amorphous heat-fusible fiber of the present invention, it is necessary that the mixture ratio of the amorphous PES type polymer (A) and the amorphous PEI type polymer (B) is weight ratio of (A)/(B)=5/95 to 95/5. The mixture ratio deviating from this range has poor effect for changing the glass transition temperature of the blend polymer, and in some cases may cause phase separation and show two or more glass transition temperatures. Accordingly, the mixture outside the above mixture ratio is not desirable in respect of the moldability in real use or the stability over a long period of time. The mixture ratio may be preferably (A)/(B)=10/90 to 90/10, more preferably (A)/(B)=10/90 to 80/20. Moreover, although the glass transition temperature of the amorphous heat-fusible fiber of the present invention can be controlled in the wide range by changing the mixture ratio of (A) and (B), the preferable glass transition temperature may be 80 to 200° C., more preferably 85 to 200° C., and still more preferably 90 to 200° C. in view of practical use and cost.

(Single Glass Transition Temperature)

It is very important for the amorphous heat-fusible fiber of the present invention to be amorphous and has a single glass transition temperature. When there are two or more glass transition temperatures, it means that the state is substantially non-compatible and phase-separated. Such a state is not desirable because not only making the processability in the fiber manufacturing process deteriorated but also making the condition setup for heat fusion treatment difficult, and further making the molded article formed from the fiber to have poor quality stability and heat-resisting property. In the present description, the amorphous property of the fiber can be confirmed by heating the obtained fiber by using a differential scanning calorimeter (DSC) at an elevating temperature of 10° C./min. in the nitrogen atmosphere to determine the existence of an endothermic peak. In the case where the endothermic peak is very broad and unable to be determined clearly, the fiber is regarded as a substantially amorphous fiber because it fulfills satisfactory level in real use.

When a crystalline PES type polymer and a PEI type polymer are mixed, it is known that the obtained mixture is excellent in heat-resisting property because the amorphous portion of the mixture is uniformly compatibilized on the molecular level so as to change the glass transition temperature according to the relational expression of Gordon-Taylor, and further known that the mixture has an enhanced glass transition temperature depending on the increased ratio of the PEI type polymer [for example, see "Miscibility of poly(ether imide) and poly(ethylene terephthalate)", Journal of Applied Polymer Science 48, 935-937 (1993), "Miscibility and Crystallization Behavior of Poly(ethylene terephthalate)/Poly(ether imide) Blends", Macromolecules, 28, 2845-2851 (1995), and "Spectroscopic studies of the crystallization behaviour in poly(ether imide)/poly(ethylene terephthalate) blends", Polymer, 38, 4043-4048 (1997)]. That is, it is so-called crystalline polyethylene terephthalate obtained from terephthalic acid and ethylene glycol to show good compatibility with PEI type polymer. The mixture shows uniform compatibility in the amorphous part, but if the mixture ratio is not appropriate, the mixture still has crystalline part to be remained and is unable to be used as a heat-fusible fiber. Further even if the mixture is amorphous, it still has the problem such as phase separation caused by crystallization of the polymer preserved for a long time. In the present invention, the inventors have paid attention to this point, and completed the invention as the result of intensive various studies to obtain a perfect amorphous heat-fusible fiber which is neither crystallized nor phase-separated in the long-term preservation, has amorphous polymers uniformly compatibilized with each other, and has a single glass transition temperature. The "glass transition temperature" in the present description can be calculated from the peak temperature at which the temperature dependency of loss tangent (tan δ) was measured by using a solid dynamic viscoelasticity equipment "Rheospectoler DVE-V4" produced by Rheology Co., Ltd. at an elevating temperature of 10° C./min. in the frequency of 10 Hz. It should be noted that the peak temperature of the temperature dependency of loss tangent (tan δ) is a temperature at which the first differentiation value of the changed amount of the tan δ value to the temperature is zero.

(Amorphous PES Type Polymer)

The amorphous PES type polymer which constitutes the amorphous heat-fusible fiber of the present invention is now described. The amorphous PES type polymer used in the present invention is not limited to a specific one as long as the polymer does not substantially have a melting point, and only has a glass transition temperature. Examples of the amorphous PES type polymers include a polymer comprising terephthalic acid and isophthalic acid as the dicarboxylic-acid component. The preferable polymer may be an amorphous PES type polymer consisting of terephthalic acid component (D) and isophthalic-acid component (E) as the dicarboxylic acid component in the copolymerization ratio (mole % ratio) of (D)/(E)=70/30 to 40/60. By using such a amorphous PES type polymer, the PES type polymer can be uniformly compatibilized to an amorphous PEI-type polymer so as to obtain an amorphous heat-fusible fiber having a single glass transition point and excellent in heat-resisting property, fire retardancy, and dimensional stability. The copolymerization ratio (mole % ratio) of (D)/(E) is preferably 65/35 to 45/55 and more preferably 60/40 to 50/50.

The amorphous PES type polymer of the present invention may comprise other dicarboxylic acid component(s) other than terephthalic acid and an isophthalic acid in small amounts unless the effect of the present invention is spoiled. Examples of other dicarboxylic acid components include aromatic dicarboxylic acids, such as naphthalenedicarboxylic acid, diphenylsulphonedicarboxylic acid, benzophenonedicarboxylic acid, 4,4'-diphenyldicarboxylic acid, 3,3'-diphenyldicarboxylic acid, etc.; aliphatic dicarboxylic-acids such as adipic acid, succinic acid, azelaic acid, sebacic acid, dodecanedioic acid, etc.; and alicyclic dicarboxylic acids, such as hexahydroterephthalic acid, 1,3-adamantanedicarboxylic acid, etc. Moreover, as glycol components other than ethylene glycol, aliphatic, there may be mentioned, for example aromatic diols, such as chlorohydroquinone, 4,4'-dihydroxybiphenyl, 4,4'-dihydroxydiphenylsulphone, 4,4'-dihydroxydiphenylsulfide, 4,4'-dihydroxy benzophenone, p-xyleneglycol, etc.; and aliphatic or alicyclic diols such as diethyleneglycol, propanediol, butanediol, hexanediol, neopentylglycol, cyclohexanedimethanol, etc.

The ultimate viscosity of the amorphous PES is not limited to a specific one, the ultimate viscosity may preferably in the range of 0.6 to 1.3 from the viewpoint of mechanical property, smooth processability and cost of fiber to be obtained. In the description, the ultimate viscosity is a viscosity which is calculated from a viscosity measured at 25° C. in the orthochlorophenol solution, and is expressed by "η".

The method for producing the amorphous PES type polymer used in the present invention is not limited to a specific one, and can be produced by a known method. That is, the amorphous PES type polymer can be produced by trans esterification of a dicarboxylic acid component and a glycol component as a starting material followed by molten polymerization; by direct esterification of a dicarboxylic acid component and a glycol component followed by molten polymerization; and others.

(Amorphous PEI Type Polymer)

The PEI polymer which constitutes the amorphous PEI fiber of the present invention is further described. The amorphous PEI polymer used in the present invention is a polymer comprising an aliphatic, alicyclic, or aromatic ether unit and a cyclic imide as a repeating unit, and is not limited to a specific one as long as the polymer has an amorphous property and melt-formability. Moreover, the main chain of the amorphous PEI polymer also comprises a structural unit, such as an aliphatic, alicyclic or aromatic ester unit and an oxycarbonyl unit, other than the cyclic imide and the ether unit within the range that the effect of the present invention is not deteriorated.

More concretely, as the amorphous PEI polymer to be suitably used, there may be mentioned a polymer comprising a unit of the following general formula recited in [Formula 2]. It should be noted that in the formula R1 is a divalent aromatic residue having 6 to 30 carbon atoms; R2 is a divalent organic group selected from the group consisting of an aromatic residue having 6 to 30 carbon atoms, an alkylene group having 2 to 20 carbon atoms, a cycloalkylene group having 2 to 20 carbon atoms, and a polydiorganosiloxane group in which a chain is terminated with an alkylene group having 2 to 8 carbon atoms.

[Formula 2]

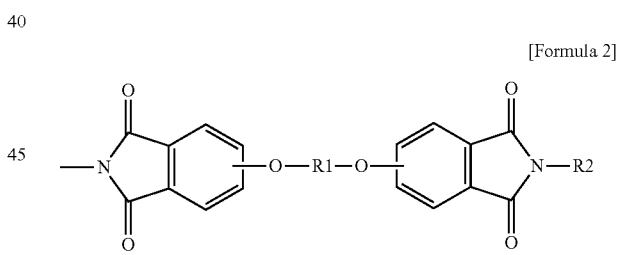

The preferable R1 and R2 include, for example, an aromatic residue shown in the following formulae recited in [Formula 3].

[Formula 3]

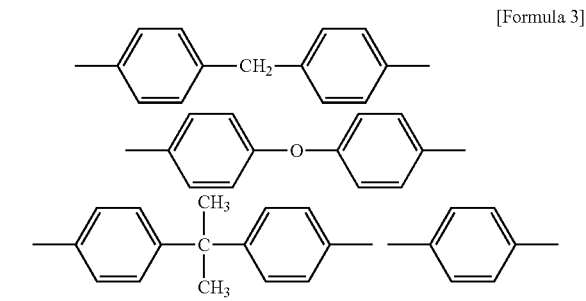

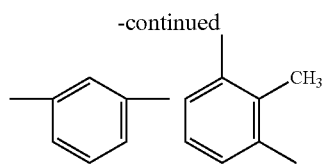

The amorphous PEI type polymer used in the present invention preferably has a glass transition temperature of 200° C. or higher. The PEI type polymer having a glass transition temperature of lower than 200° C. is not preferable because the heat resisting property of the heat-fusible fiber obtained may be inferior. In the meantime, although the amorphous PEI type polymer having a higher glass transition temperature can be contributed to obtain a heat-fusible fiber excellent in heat-resisting property, the amorphous PEI type polymer having too high glass transition temperature is not preferably because it needs high temperature for fusing, and may cause polymer decomposition. The glass transition temperature of the amorphous PEI type polymer may be preferably 200 to 230° C. and more preferably 205 to 220° C. In the present invention, from the viewpoint of an amorphous property, melt formability, and cost reduction, the preferable amorphous PEI polymer includes a condensate of 2,2-bis[4-(2,3-dicarboxyphenoxy)phenyl]propane dianhydride and m-phenylenediamine, having a structural unit shown by the following [Formula 4] as a main constituent. Such polyetherimide is available from SABIC Innovative Plastics Holding under the trademark of "Ultem".

tonites and alumina silicates; metallic oxides, such as silicon oxides, magnesium oxides, aluminas, zirconium oxides, titanium oxides, and iron oxides; carbonates such as calcium carbonates, magnesium carbonates and dolomites; sulfates such as calcium sulfates and barium sulfates; hydroxides, such as calcium hydroxides, magnesium hydroxides and aluminum hydroxides; glass beads, glass flakes, glass powders, ceramic beads, boron nitrides, silicon carbides, carbon blacks and silicas, graphites, and others. As the sequestering agent for terminal group, there may be used mono- or diepoxy compounds, mono- or polycarbodiimide compounds, mono- or dioxazoline compounds, mono- or a diazirine compounds, and others.

(Dry Heat Shrinkage Percentage)

The heat-fusible fiber of the present invention preferably has a dry heat shrinkage percentage at a temperature of (glass transition temperature −10) ° C. of 3.0% or less. If the shrinkage percentage of the fiber under dry heat exceeds 3.0%, the fiber is determined to have an insufficient heat-resisting property, resulting in enlargement of dimensional change of the product at the time of processing and/or usage. The dry heat shrinkage percentage is more preferably 2.5% or less and still more preferably 2.0% or less. The fiber excellent in heat stability can be obtained by not drawing the spun fiber in the fiber formation process as described later. It should be noted that the dry heat shrinkage percentage here means the value measured by the method described later.

(Fire Retardancy)

Further, the heat-fusible fiber of the present invention has an improved fire retardancy due to the polymer nature, and

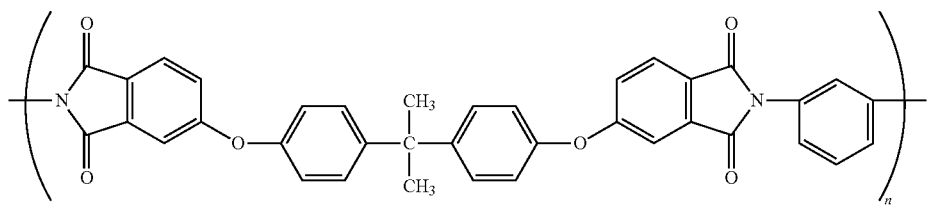

[Formula 4]

The molecular weight of the amorphous PEI type polymer used in the present invention is not limited to a specific one, the amorphous PEI-type polymer may preferably have a weight average molecular weight (Mw) of 1,000 to 80,000 when considering compatibility with PES type polymer, the mechanical property and dimensional stability of the obtained fiber, and processability. Although the amorphous PEI type polymer having high molecular weight is preferably used in view of fiber tenacity and heat-resisting property, Mw is preferably 2,000 to 50,000, more preferably 3,000 to 40,000 from the viewpoint of cost required for polymer production or fiber production.

(Components Other Than PES Type Polymer and PEI Type Polymer)

The amorphous heat-fusible fiber of the present invention may contain an antioxidant, an antistatic agent, a radical inhibitor, a delustering agent, an ultraviolet absorber, a flame retardant, an inorganic substance, a sequestering agent for terminal group for improving hydrolysis-proof property of the fiber and others within the range that they do not inhibit the effect of the present invention. Examples of the above-mentioned inorganic substances include carbon nanotubes, fullerenes; silicates, such as talcs, wollastonites, zeolites, sericites, micas, kaolins, clays, pyrophyllites, silicas, benthe fiber may have, for example, a limiting oxygen index value (LOI value) of 20 or greater, preferably of 22 or greater, and more preferably of 24 or greater. It should be noted that the LOI value here is a value measured by the method in Examples described below.

(Single Fiber Fineness and Cross-Sectional Form)

The single fiber fineness of the amorphous heat-fusible fiber obtained in the present invention is not limited to a specific one, and the fiber of wide ranges of single fiber fineness can be utilized. The single fiber fineness may be, for example, 0.1 to 50 dtex, and preferably 0.5 to 20 dtex. The fineness of the fiber can be suitably adjusted by changing a nozzle diameter or a discharge rate of the polymer. The cross-sectional form of the fiber at the discharging is not limited to a specific one, and may be circular, hollow, flat, or an atypical section form such as star.

(Production of Amorphous Heat-Fusible Fiber)

The production process of the amorphous heat-fusible fiber of the present invention is not limited to a specific one. The fiber can be produced by using a known melt-spinning machine. At first amorphous PES type polymer pellets and amorphous PEI type polymer pellets are melt-kneaded with an extruder. It is desirable to use a coaxial twin-screw extruder in order to melt and blend uniformly. Although the temperature for kneading is required to be higher than the glass transition temperature of the amorphous PES type polymer as well as amorphous PEI-type polymer to be used, too high temperature is not preferable because the polymer degradation may happen. Accordingly, the temperature for kneading is preferably 260 to 350° C., and more preferably 260 to 340° C. Subsequently, the molten polymer is guided to a spinning tube, and metered by a gear pump to discharge a predetermined amount from a spinning nozzle, and the discharged yarn is wound up to produce an amorphous heat-fusible fiber of the present invention. The hole size (single hole) of the nozzle may be for example, about 0.01 mm$^2$ to about 0.07 mm$^2$, preferably about 0.02 mm$^2$ to 0.06 mm$^2$. It should be noted that the form of the hole can be suitably chosen according to the section form required for the fiber. The amount of the polymer discharged from the spinning nozzle can be suitably selected according to the number of holes in the nozzle or the hole size, and may be, for example, about 35 to 300 g per minute (g/min.), preferably about 40 to 280 g/min. The taking-up rate of the discharged yarn is not limited to a specific one and is preferably within a range between 500 m/min. and 4,000 m/min. from the viewpoint of preventing molecular orientation in the yarn at the spinning. The taking-up rate lower than 500 m/min. may not be preferable from the viewpoint of productivity, while the high speed such as the taking-up rate higher than 4000 m/min. may advance molecular orientation for causing the shrinkage at high temperatures as well as have a possibility to cause fiber break.

In the production process of the amorphous heat-fusible fiber of the present invention, in order to secure the heat-resisting property of fiber, it is desirable not to give drawing to the as-spun fiber in contrast to the common drawing process. Since PES type polymer and PEI type polymer are amorphous, if the as-spun fiber is drawn like the conventional fiber which is drawn in the manufacturing process, such drawing processing may develop the entropy shrinkage resulting from increase in molecule movement under high temperature, and lead to a serious shrinkage of drawn fiber. Accordingly, drawing process may be a minus factor for attaining heat-resisting property such as moldability or dimensional stability required for real use. From this point, in the present invention, it is preferable not to give drawing to the as-spun fiber in order that the amorphous heat-fusible fiber with high heat-resisting property is produced considering the "amorphous" feature.

(Fiber Structure and Molded Article)

The amorphous heat-fusible fiber of the present invention can be used for various applications by forming a fiber structure such as paper, nonwoven fabric, knitting, and texture from the form such as staple fibers, shortcut fibers, filament yarns, spun yarns, etc. In particular, the amorphous heat-fusible fiber of the present invention can be advantageously applicable to papers or nonwoven fabrics requiring for heat-resisting property, fire retardancy, low smoke emission, electric-insulation property, etc., or a molded article obtained from the papers or nonwoven fabrics. When short-cut glass fibers or carbon fibers used as a reinforcing fiber are mixed with the amorphous heat-fusible fiber of the present invention to produce a molded article, the molded article can be used as a so-called thermoplastic composite such as a housing of home electronics or a structure component of an aircraft.

By using the amorphous heat-fusible fiber of the present invention in combination with other fibers to form a fiber structure being paper, nonwoven fabric, or in other forms, the molded article excellent in the heat-resisting property can be obtained by carrying out the fusion bonding of all or a part of the fiber structure. The amount of the amorphous heat-fusible fiber in the fiber structure can be suitably selected according to the required physical properties of the molded article to be obtained, and should be at least 10% by weight or higher (based on the fiber structure) for producing the molded article, and is preferably 20% by weight or higher. Since the amorphous heat-fusible fiber of the present invention itself has a heat-resisting property and fire retardancy, when the fiber structure comprises the amorphous heat-fusible fiber to be compounded at the percentage of 30% by weight or higher, it is possible to obtain a paper as well as a nonwoven fabric excellent in heat-resisting property and having low smoke emission. The fiber usable in combination with the amorphous heat-fusible fiber is not limited to a specific one, and there may be exemplified general fibers, such as a polyvinyl alcohol fiber, a polyolefinic fiber, a polyester fiber, a polyamide fiber, a cellulosic fiber, and a polysulfone fiber; and heat-resistant fibers, such as an aromatic para-aramid fiber, an aromatic polyester fiber, a polyarylketone fiber, and a polysulfone fiber, and others. Moreover, the thermoplastic composite excellent in the heat-resisting property can be produced by preparing a paper or nonwoven fabric in which an amorphous heat-fusible fiber of the present invention is mixed with an inorganic fiber, such as carbon fiber, alumina fiber, glass fiber, and silicon carbide fiber, and heating them for fusion-bonding at a temperature of higher or equal to the grass transition temperature of amorphous fusible fiber so as to make both fibers unified like a matrix.

It should be noted herein that the term "fusion bonding" in the "fusion-bonding treatment" is used to include a fusion bonding in which a fiber structure containing an amorphous heat-fusible fiber is heated higher than or equal to the glass transition point temperature of the amorphous heat-fusible fiber to fusion-bond the heat-fusible fiber to a constituent fiber in the fiber structure; a fusion bonding between two or more fiber structures which include at least a fiber structure containing an amorphous heat-fusible fiber; and a fusion bonding between a fiber structure and a polymer.

The amorphous heat-fusible fiber of the present invention can be used as a thread-like material such as cut fiber, staple fiber, filament, and spun yarn, as well as a heat-resistant fiber structure, such as paper, nonwoven fabric, textile, and knitting. Such an amorphous heat-fusible fiber has heat-resisting property, dimensional stability, fire retardancy, and low smoke emission, and also has dye affinity. In particular, since the amorphous heat-fusible fiber excels in heat-resisting property, the fiber can be effectively used in many applications including, such as industrial material fields, electric and electronic material fields, agricultural material fields, apparel fields, optical material fields, and aircraft, automobile, and vessel material fields, as well as many applications other than above, and especially useful for thermoplastic composites, sheet cushion materials, hook-and-loop fasteners, highly efficient filters, and others.

EXAMPLES

Hereinafter, the present invention will be demonstrated by way of some examples that are presented only for the sake of illustration, which are not to be construed as limiting the scope of the present invention. It should be noted that in the following Examples, intrinsic viscosity of amorphous PES type polymer, crystalline melting heat, glass transition temperature, dry heat shrinkage percentage, limiting oxygen index, and bending elastic modulus were evaluated in the following manners.

[Intrinsic Viscosity of Amorphous PES Type Polymer (η)]

The intrinsic viscosity of an amorphous PES type polymer is calculated from the viscosity measured at 30° C. in the solution in which the amorphous PES type polymer is dissolved in the mixed solvent of phenol/chloroethane (weight ratio 1/1).

[Crystalline Melting Heat (cal/g)]

The crystalline melting heat of a fiber is determined by the area of the endothermic peak observed by using a "TA3000 DSC" produced by Mettler Co., purged with nitrogen at an elevating rate of 10° C./min. until 400° C. When the endothermic peak is not observed, i.e., ΔH=0 cal/g, it is determined that the fiber has amorphous property.

[Glass Transition Temperature (° C.)]

The glass transition temperature of a fiber is calculated from the peak temperature by using a solid viscoelasticity measuring device "Rheospectra DVE-V4" produced by Rheology Co. to measure temperature dependency of loss tangent (tan δ) in the frequency of 10 Hz and by heating at an elevating temperature of 10° C./min.

[Dry Heat Shrinkage Percentage (%)]

The fiber samples cut to 10 cm length were heated at an elevating temperature of 2° C./min. from the room temperature to a temperature of (glass transition temperature −10)° C. in the state where terminals of the each fiber were not fixed, and then the length (X) of each heated fiber was measured. The dry heat shrinkage percentage of the fibers was calculated in the following formula:

Dry heat shrinkage percentage (%)=<(10−$X$)/10>× 100

[Limiting Oxygen Index Value (LOI Value)]

Samples each tied into a braid and having a length of 18 cm were prepared. According to JIS K7201, after igniting the upper portion of the samples, the minimum oxygen concentration required for the samples to keep burning for at least 3 minutes or alternatively to be burned until the burning length of the sample became at least 5 cm was determined. The average of 3 samples (n=3) was adopted.

[Bending Elastic Modulus]

The bending elastic modulus of molded articles was measured in accordance with JIS K7171 with a test piece (thickness: 4 mm×width: 10 mm×length: 80 mm) at a test speed of 2 mm/min. and span of 64 mm.

Reference Example 1

(1) By using a polymerization reaction equipment, polycondensation reaction was carried out at 280° C. in an ordinary method to produce an amorphous PES type polymer comprising terephthalic acid (hereinafter may be abbreviated as TA) and isophthalic acid (hereinafter may be abbreviated as IPA) in the copolymerization ratio (mole %) of 57/43, ethylene glycol (hereinafter may be abbreviated as EG) at 98 mol %, and diethylene glycol (hereinafter may be abbreviated as DEG) at 2 mol %; and having an intrinsic viscosity (η) of 0.69. The produced polymer was extruded from the bottom of the polymerization reaction equipment into water in the shape of strand to be cut into a pellet. The endothermic peak was not observed by DSC measurement in the obtained PES type polymer so as to determined as amorphous.

(2) The amorphous PES type polymer obtained above was supplied to a vent type coaxial twin-screw extruder with screws rotatable in the same direction heated at 270° C. After two minutes detention period, the heated polymer was guided to a spinning head heated at 280° C., and discharged from a spinning nozzle having round holes at a discharge rate of 28 g/min. The discharged polymer was wound at a spinning rate of 1,000 m/min. to obtain multi-filaments (280 dtex/50 f) consisting of the amorphous PES type polymer. The performance evaluation result of the obtained fiber is shown in Table 1.

(3) The appearance of the obtained fiber was good and no fluff was observed. The fiber was amorphous and had a single glass transition temperature of 74° C., a dry heat shrinkage percentage at a temperature of (glass transition temperature −10)° C. of 0.3%. The fiber, however, was melted and dripped when the LOI value of the fiber was observed. The fiber did not have sufficient fire retardancy.

Example 1

(1) The amorphous PES type polymer chips obtained in the above Reference Example 1 and an amorphous PEI-type polymer chips ("ULTEM1040" produced by SABIC Innovative Plastics Holding, glass-transition temperature: 215° C.) were blended in the mixture ratio (weight ratio) of 50/50, and the mixture was supplied to the vent type coaxial twin-screw extruder heated at 300° C. After two minutes detention period, the heated polymer was guided to a spinning head heated at 325° C., and discharged from a spinning nozzle having round holes at a discharge rate of 28 g/min. The discharged polymer was wound at a spinning rate of 1,000 m/min. to obtain multi filaments (280 dtex/50 f) consisting of the amorphous PES type polymer. The performance evaluation result of the obtained fiber is shown in Table 1.

(2) The appearance of the obtained fiber was good and no fluff was observed. The fiber was amorphous and had a single glass transition temperature of 124° C., a dry heat shrinkage percentage at a temperature of (glass transition temperature −10)° C. of 0.1%, and an LOI value of 24. The fiber was excellent in fire retardancy and heat-resisting property.

Examples 2 to 5

(1) Except for changing the mixture ratio of amorphous PES type polymer and the amorphous PEI-type polymer in Example 1 into the ratios recited in Table 1, fibers were obtained in the same spinning method as Example 1. The performance evaluation result of the obtained fiber is shown in Table 1.

(2) The appearances of the obtained fibers were good and no fluff was observed. The fibers were amorphous in any of the mixture ratio of Examples 2 to 5 and had a single glass transition temperature and a dry heat shrinkage percentage at a temperature of (glass transition temperature −10)° C. of 3% or less. Further, the higher mixture ratios of the amorphous PEI-type polymer were, the higher glass transition temperature and LOI value were. The obtained fibers shows excellent fire retardancy and heat-resisting property.

Examples 6 to 9

(1) Except for changing the copolymerization ratio of terephthalic acid and isophthalic acid in Reference Example 1 into the ratios recited in Table 1, PES fibers were obtained in the same spinning method as Example 1. The performance evaluation result of the obtained fibers is shown in Table 1.

(2) The appearances of the obtained fibers were good and no fluff was observed. Each of the fibers obtained in any PES type polymers was amorphous and uniformly compatibilized. The fibers had a single glass transition temperature and a dry heat shrinkage percentage at a temperature of (glass transition temperature −10)° C. of 1% or less. Further, any of the amorphous polymers had higher glass transition temperature and LOI value than those of Reference Example 1, and was excellent in fire retardancy and heat-resisting property.

under dry heat at a temperature of (glass transition temperature −10)° C. of 5% or greater and were not excellent in heat-resisting property.

TABLE 1

| | Polymer | | | | | Mixture | | Fiber Properties | | | |
|---|---|---|---|---|---|---|---|---|---|---|---|
| | (A)Amorphous PES Polymer | | | | (B)Amorphous | ratio | ΔH | Glass Transition Temperature | Shrinkage Percentage | LOI | |
| | TA | IPA | EG | DEG | PEI Polymer | (A)/(B) | (cal/g) | (°C.) | (%) | (%) | Remarks |
| Ref. Ex. 1 | 57 | 43 | 98 | 2 | ULTEM#1040 | 100/0 | 0 | 74 | 0.3 | No fire retardancy (Melted and dripped) | — |
| Ex. 1 | 57 | 43 | 98 | 2 | ULTEM#1040 | 50/50 | 0 | 124 | 0.1 | 24 | |
| Ex. 2 | 57 | 43 | 98 | 2 | ULTEM#1040 | 95/5 | 0 | 81 | 0.2 | 20 | |
| Ex. 3 | 57 | 43 | 98 | 2 | ULTEM#1040 | 75/25 | 0 | 102 | 0.5 | 22 | |
| Ex. 3 | 57 | 43 | 98 | 2 | ULTEM#1040 | 60/40 | 0 | 120 | 1.0 | 24 | |
| Ex. 4 | 57 | 43 | 98 | 2 | ULTEM#1040 | 25/75 | 0 | 172 | 1.6 | 27 | |
| Ex. 5 | 57 | 43 | 98 | 2 | ULTEM#1040 | 5/95 | 0 | 209 | 2.8 | 30 | |
| Ex. 6 | 70 | 30 | 98 | 2 | ULTEM#1040 | 50/50 | 0 | 123 | 0.1 | 23 | |
| Ex. 7 | 50 | 50 | 98 | 2 | ULTEM#1040 | 50/50 | 0 | 125 | 0.2 | 24 | |
| Ex. 8 | 45 | 55 | 98 | 2 | ULTEM#1040 | 50/50 | 0 | 124 | 0.2 | 24 | |
| Ex. 9 | 40 | 60 | 98 | 2 | ULTEM#1040 | 50/50 | 0 | 123 | 0.5 | 24 | |
| Com. Ex. 1 | 57 | 43 | 98 | 2 | ULTEM#1040 | 97/3 | 0 | 76 | 0.1 | No fire retardancy Melted and dripped) | |
| Com. Ex. 2 | 100 | 0 | 98 | 2 | ULTEM#1040 | 50/50 | 5.5 | 123 | 3.1 | 24 | Crystalline component (m.p. = 250° C.) |
| Com. Ex. 3 | 75 | 25 | 98 | 2 | ULTEM#1040 | 50/50 | 4.3 | 120 | 2.8 | 23 | Crystalline component (m.p. = 246° C.) |
| Com. Ex. 4 | 35 | 65 | 98 | 2 | ULTEM#1040 | 50/50 | 0 | 74, 121 | 3.9 | 19 | Two glass transition temperature |

Comparative Example 1

(1) Except for changing the mixture ratio of amorphous PES type polymer and the amorphous PEI-type polymer in Example 1 into the ratio of 97/3, fiber was obtained in the same spinning method as Example 1. The performance evaluation result of the obtained fiber is shown in Table 1.

(2) The appearance of the obtained fiber was good. The fibers were amorphous and had a single glass transition temperature, but the value was 76° C. The fiber, however, was melted and dripped when the LOI value of the fiber was observed. The fiber did not have sufficient fire retardancy.

Comparative Examples 2 to 4

(1) Except for changing the copolymerization ratio of terephthalic acid and isophthalic acid in Reference Example 1 into the ratios recited in Table 1, PES type fibers were obtained in the same spinning method as Example 1. The performance evaluation result of the obtained fibers is shown in Table 1.

(2) The appearances of the obtained fibers were good and no fluff was observed. However, each of the fibers obtained in any PES type polymers showed a melting point and/or a plurality of glass transition temperatures and deteriorated in compatibility. The fibers also had shrinkage percentages As shown in Table 1, each of the amorphous heat-fusible fibers of the present invention is completely amorphous, and has a single glass transition temperature. The fibers are excellent in heat-resisting property, fire retardancy, and dimensional stability, as well as spinning stability.

Example 10

(1) The amorphous heat-fusible fiber obtained in Example 1 was cut into short fibers having a length of 5 mm. Three sheets of wet-laid papers each having a basis weight of 500 g/m² were produced from 50% by weight of the above short fibers and 50% by weight of short-cut carbon fibers having a length of 3 mm.

(2) The obtained papers were stacked (total basis weight: 1500 g/m²), and then subjected to compression molding at 150° C. at which the amorphous heat-fusible fibers soften and flow to obtain a molded article. A piece of the obtained molded article was cut as a sample to measure dynamic viscoelasticity and DSC. The sample was amorphous and had a single glass transition temperature of 124° C.

(3) The obtained molded article had a bending elastic modulus of 35 GPa. The temperature dependency of the molded article was investigated and revealed that the molded article had the elastic modulus constantly retained to 124° C. which was the glass transition temperature of the matrixed amorphous heat-fusible fibers and was excellent in heat-resisting property. Moreover, even after keeping the molded article at 100° C. for 168 hours, the molded article had an elastic modulus of 35 GPa which does not vary from the value of 35 GPa mentioned above and a dry heat shrinkage percentage was 0.5% to be excellent in dimensional stability. There was also no change on appearance.

(4) When the temperature dependency of the elastic modulus of the molded article kept at 100° C. for 168 hours was measured, the molded article had the constantly retained elastic modulus until 124° C. and was excellent in durability.

Example 11

(1) Except for using the amorphous heat-fusible fiber [mixture ratio (A)/(B):75/25] obtained in Example 3, three sheets of wet-laid papers each having a basis weight of 500 g/m² were produced in the same way as Example 10.

(2) The obtained papers were stacked (total basis weight: 1500 g/m²), and then subjected to compression molding at 150° C. at which the amorphous heat-fusible fiber softens and flows to obtain a molded article. A piece of the obtained molded article was cut as a sample to measure dynamic viscoelasticity and DSC. The sample was amorphous and had a single glass transition temperature of 102° C.

(3) The obtained molded article had a bending elastic modulus of 32 GPa. The temperature dependency of the molded article was investigated and revealed that the molded article had the elastic modulus constantly retained to 102° C. which is the glass transition temperature of the matrixed amorphous heat-fusible fibers and was excellent in heat-resisting property. Moreover, even after keeping the molded article at 100° C. for 168 hours, the molded article had an elastic modulus of 30 GPa which does not vary so much from the value of 32 GPa mentioned above and a dry heat shrinkage percentage was 0.6% to be excellent in dimensional stability. There was also no change on appearance.

(4) When the temperature dependency of the elastic modulus of the molded article kept at 100° C. for 168 hours was measured, the molded article had the constantly retained elastic modulus until 102° C. and was excellent in durability.

Example 12

(1) Except for using the amorphous heat-fusible fiber obtained in Example 4, three sheets of wet-laid papers each having a basis weight of 500 g/m² were produced in the same way as Example 10.

(2) The obtained papers were stacked (total basis weight: 1500 g/m²), and then subjected to compression molding at 200° C. at which the amorphous heat-fusible fiber softens and flows to obtain a molded article. A piece of the obtained molded article was cut as a sample to measure dynamic viscoelasticity and DSC. The sample was amorphous and had a single glass transition temperature of 172° C.

(3) The obtained molded article had a bending elastic modulus of 37 GPa. The temperature dependency of the molded article was investigated and revealed that the molded article had the elastic modulus constantly retained to 172° C. which is the glass transition temperature of the matrixed amorphous heat-fusible fibers and was excellent in heat-resisting property. Moreover, even after keeping the molded article at 100° C. for 168 hours, the molded article had an elastic modulus of 36 GPa which does not vary so much from the value of 37 GPa mentioned above and a dry heat shrinkage percentage was 0.5% to be excellent in dimensional stability. There was also no change on appearance.

(4) When the temperature dependency of the elastic modulus of the molded article kept at 100° C. for 168 hours was measured, the molded article had the constantly retained elastic modulus until 172° C. and was excellent in durability.

Example 13

(1) Except for using the amorphous heat-fusible fiber obtained in Example 5, three sheets of wet-laid papers each having a basis weight of 500 g/m² were produced in the same way as Example 10.

(2) The obtained papers were stacked (total basis weight: 1500 g/m²), and then subjected to compression molding at 240° C. at which the amorphous heat-fusible fiber softens and flows to obtain a molded article. A piece of the obtained molded article was cut as a sample to measure dynamic viscoelasticity and DSC. The sample was amorphous and had a single glass transition temperature of 209° C.

(3) The obtained molded article had a bending elastic modulus of 38 GPa. The temperature dependency of the molded article was investigated and revealed that the molded article had the elastic modulus constantly retained to 209° C. which is the glass transition temperature of the matrixed amorphous heat-fusible fibers and was excellent in heat-resisting property. Moreover, even after keeping the molded article at 100° C. for 168 hours, the molded article had an elastic modulus of 35 GPa which does not vary so much from the value of 38 GPa mentioned above and a dry heat shrinkage percentage was 0.3% to be excellent in dimensional stability. There was also no change on appearance.

(4) When the temperature dependency of the elastic modulus of the molded article kept at 100° C. for 168 hours was measured, the molded article had the constantly retained elastic modulus until 209° C. and was excellent in durability.

Comparative Example 5

(1) The amorphous heat-fusible fiber obtained in Comparative Example 1 was cut into short fibers having a length of 5 mm. Three sheets of wet-laid papers each having a basis weight of 500 g/m² were produced from 50 mass % of the above short fibers and 50 mass % of short-cut carbon fibers having a length of 3 mm.

(2) The obtained papers were stacked (total basis weight: 1500 g/m²), and then subjected to compression molding at 150° C. at which the amorphous heat-fusible fiber softens and flows to obtain a molded article. A piece of the obtained molded article was cut as a sample to measure dynamic viscoelasticity and DSC. The sample had a single glass transition temperature of 123° C., but also had a melting point of 250° C. and semi-crystalline.

(3) The obtained molded article had a bending elastic modulus of 30 GPa. The temperature dependency of the molded article was investigated and revealed that the molded article had the elastic modulus constantly retained to 123° C. which is the glass transition temperature of the matrixed amorphous heat-fusible fibers and was excellent in heat-resisting property. After keeping the molded article at 100° C. for 168 hours, the molded article had an elastic modulus of 34 GPa, but a dry heat shrinkage percentage of 4%. The molded article was a little opaque and insufficient in dimensional stability and quality.

(4) When the temperature dependency of the elastic modulus of the molded article kept at 100° C. for 168 hours was measured, the first depression of the elastic modulus was observed at 75° C., and then was observed the second depression at 123° C. The molded article was not excellent in durability. It is assumed that the phase separation of the crystalline PET component was developed.

Comparative Example 6

(1) Except for using the amorphous heat-fusible fiber obtained in Reference Example 1, three sheets of wet-laid papers each having a basis weight of 500 g/m² were produced in the same way as Comparative Example 5.

(2) The obtained papers were stacked (total basis weight: 1500 g/m²), and then subjected to compression molding at 150° C. at which the amorphous heat-fusible fiber softens and flows to obtain a molded article. A piece of the obtained molded article was cut as a sample to measure dynamic viscoelasticity and DSC. The sample was amorphous and had a single glass transition temperature of 74° C.

(3) The obtained molded article had a bending elastic modulus of 32 GPa. The temperature dependency of the molded article was investigated and revealed that the molded article had the elastic modulus constantly retained to 74° C. which is the glass transition temperature of the matrixed amorphous heat-fusible fibers. However, after keeping the molded article at 100° C. for 168 hours, the molded article had an elastic modulus of 25 GPa. The molded article was insufficient in dimensional stability and quality because of the reason such that the molded article was partly melted and unable to retain the configuration.

(4) When the temperature dependency of the elastic modulus of the molded article kept at 100° C. for 168 hours was measured, the depression of the elastic modulus was observed at 74° C. The molded article was not excellent in durability.

The results of Examples 10 to 13 and Comparative Examples 5 to 6 revealed that the molded articles produced using each of the amorphous heat-fusible fibers related to the present invention had high heat-resisting property as well as stability for a long period of time.

INDUSTRIAL APPLICABILITY

According to the present invention, there is provided an amorphous heat-fusible fiber having an outstanding heat resistance, fire retardancy, and dimensional stability; and a heat-resistant molded article formed by fusion-bonding a fiber structure containing the fiber. They can be effectively applicable to a use frequently exposed to high temperature environment in general industrial material fields, electric and electronic fields, agricultural material fields, optical material fields, aircraft, automobile, and vessel material fields, apparel fields, etc.

As mentioned above, the preferred embodiments of the present invention are illustrated, but it is to be understood that other embodiments may be included, and that various additions, other changes or deletions may be made, without departing from the spirit or scope of the present invention.

What is claimed is:
1. A method for producing an article, the method comprising:
heating a fiber structure which comprises an amorphous heat-fusible fiber and a constituent fiber other than the amorphous heat-fusible fiber, at a temperature of higher or equal to the glass transition temperature of the amorphous heat-fusible fiber, at which the amorphous heat-fusible fiber softens and flows such that the constituent fiber is fusion-bonded with the amorphous heat-fusible fiber, wherein the amorphous heat-fusible fiber does not contain a crystalline polyester and comprises:
(A) an amorphous polyester; and
(B) an amorphous polyetherimide, the weight ratio of (A)/(B) is 5/95 to 95/5, and
wherein the amorphous heat-fusible fiber has a single glass transition temperature in a range between 80° C. and 200° C.

2. The method of claim 1, wherein the amorphous polyester (A) comprises a terephthalic acid unit (D) and an isophthalic acid unit (E), and the copolymerization ratio (mole % ratio) of (D)/(E) ranges from 70/30 to 40/60.

3. The method of claim 2, wherein the constituent fiber includes a polyvinyl alcohol fiber, a polyamide fiber, a polyester fiber, a para-aramid fiber, a polyarylketone fiber, a polysulfone fiber, an inorganic fiber, or a combination thereof.

4. The method of claim 2, wherein the heat-fused fiber structure is a paper, a non-woven fabric, a knitting or a textile.

5. The method of claim 2, wherein the article is a thermoplastic composite article.

6. The method of claim 2, wherein:
the amorphous polyetherimide (B) has a glass transition temperature of 210° C. or higher and comprises a main repeating structure unit represented by the following formula:

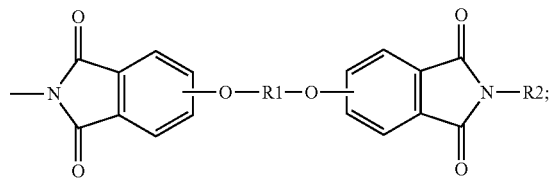

R1 represents a divalent aromatic residue having 6 to 30 carbon atoms; and
R2 represents a divalent organic group selected from the group consisting of a divalent aromatic residue having 6 to 30 carbon atoms, an alkylene group having 2 to 20 carbon atoms, a cycloalkylene group having 2 to 20 carbon atoms, and a polydiorganosiloxane group in which the polymerization is terminated by an alkylene group having 2 to 8 carbon atoms.

7. The method of claim 2, wherein the amorphous heat-fusible fiber has a dry heat shrinkage percentage of 3% or less at a temperature of (glass transition temperature −10)° C.

8. The method of claim 2, wherein the amorphous heat-fusible fiber is a melt-spun and un-drawn fiber.

9. The method of claim 2, wherein the content of the amorphous heat-fusible fiber is 10% by weight or higher based on the fiber structure.

10. The method of claim 1, wherein the constituent fiber comprises a polyvinyl alcohol fiber, a polyamide fiber, a polyester fiber, a para-aramid fiber, a polyarylketone fiber, a polysulfone fiber, an inorganic fiber, or a combination thereof.

11. The method of claim 1, wherein the heat-fused fiber structure is a paper, a non-woven fabric, a knitting or a textile.

12. The method of claim 1, wherein the article is a thermoplastic composite article.

13. The method of claim 1, wherein:
the amorphous polyetherimide (B) has a glass transition temperature of 210° C. or higher and comprises a main repeating structure unit represented by the following formula:

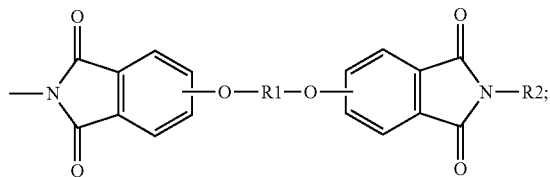

R1 represents a divalent aromatic residue having 6 to 30 carbon atoms; and
R2 represents a divalent organic group selected from the group consisting of a divalent aromatic residue having 6 to 30 carbon atoms, an alkylene group having 2 to 20 carbon atoms, a cycloalkylene group having 2 to 20 carbon atoms, and a polydiorganosiloxane group in which the polymerization is terminated by an alkylene group having 2 to 8 carbon atoms.

14. The method of claim 1, wherein the amorphous heat-fusible fiber has a dry heat shrinkage percentage of 3% or less at a temperature of (glass transition temperature −10)° C.

15. The method of claim 1, wherein the amorphous heat-fusible fiber is a melt-spun and un-drawn fiber.

16. The method of claim 1, wherein the content of the amorphous heat-fusible fiber is 10% by weight or higher based on the fiber structure.

17. A method for producing an article, the method comprising:
blending a heat-fusible fiber and a constituent fiber other than the heat-fusible fiber such that a fiber structure comprising the heat-fusible fiber and the constituent fiber is obtained; and
heating the fiber structure, at a temperature of higher or equal to the glass transition temperature of the amorphous heat-fusible fiber, at which the amorphous heat-fusible fiber softens and flows such that the constituent fiber is fusion-bonded with the amorphous heat-fusible fiber,
wherein the amorphous heat-fusible fiber does not contain a crystalline polyester and comprises:
  (A) an amorphous polyester; and
  (B) an amorphous polyetherimide, the weight ratio of (A)/(B) is 5/95 to 95/5, and
wherein the amorphous heat-fusible fiber having a single glass transition temperature in a range between 80° C. and 200° C.

18. The method of claim 17, wherein the amorphous polyester (A) comprises a terephthalic acid unit (D) and an isophthalic acid unit (E), and the copolymerization ratio (mole % ratio) of (D)/(E) ranges from 70/30 to 40/60.

* * * * *